2,776,957
WATER-SOLUBLE MORDANT AZOPHTHALOCYA-
NINE DYESTUFFS AND PROCESS FOR MAKING
THEM

Willy Brentano, Arlesheim, and Hans Grossmann and Max Müller, Basel, Switzerland, assignors to Durand & Huguenin A. G., Basel, Switzerland, a Swiss firm No Drawing. Application July 27, 1953,
Serial No. 370,612

Claims priority, application Switzerland July 31, 1952

12 Claims. (Cl. 260—146)

This invention provides new, water-soluble, mordant azo-phthalocyanine dyestuffs which are derived from a phthalocyanine tetrasulphonic acid, and contain at least one —$SO_2.NH$— group, at least one azo linkage and at least one salicylic acid group. These dyestuffs are suitable for dyeing or printing textiles and yield green to olive tints.

The dyestuffs of this invention correspond to the general formula

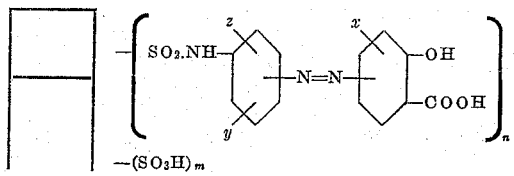

in which A represents a substituted or unsubstituted metalliferous phthalocyanine molecule in which the

—$SO_2.NH$— or the —$SO_3H$ groups are present in the 3- or 4-position, $n$ represents a whole number from 1 to 4, $m$ represents a whole number from 0 to 3, the sum of $m+n$ being equal to 4, $x$ represents a hydrogen atom, a halogen atom of a methyl, hydroxyl, nitro or sulphonic acid group, $y$ represents a hydrogen atom, a halogen atom or an alkyl, alkoxy, nitro, sulphonic acid or carboxylic acid group, and $z$ represents a hydrogen atom, a halogen atom or an alkyl or alkoxy group, and the —$SO_2.NH$— group occupies a meta- or para-position relatively to the azo linkage.

The invention also includes a process for making the above dyestuffs, wherein one molecular proportion of a phthalocyanine sulphochloride of the formula

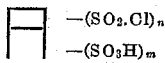

in which A, $n$ and $m$ have the meanings given above, $m+n$ being equal to 4, is reacted in an aqueous medium and in the presence of a substance capable of binding mineral acid with at least one, but advantageously 2 to 4, molecular proportions of at least one amino-azo-dyestuff of the general formula

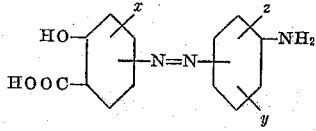

in which $x$, $y$ and $z$ have the meanings given above, and the —$NH_2$ group occupies a meta- or para-position relatively to the azo linkage.

Among the sulphochlorides of phthalocyanine tetrasulphonic acids used in the present process there are to be understood those which can be made by methods in themselves known. As phthalocyanine sulphochlorides suitable for the reaction there come into consideration especially copper-, nickel- and cobalt-phthalocyanines, and also iron-, chromium and aluminium-phthalocyanines.

Depending on the method of preparation the sulphochloride groups are present in the 4- or 3-position of the phthalocyanine molecule, and this depends on whether a 4-sulphophthalic acid is used as starting material for preparing them, or whether the sulphochloride groups are introduced by sulphonation or by direct sulphochlorination of the phthalocyanine. The number of sulphochloride groups in the molecule may range from 1 to 4. In the preparation of the sulphochlorides of phthalocyanine tetrasulphonic acids, and especially during their isolation, there are generally obtained mixtures of phthalocyanines having a different number of sulphochloride groups.

Examples of suitable amino-azo-dyestuffs, which are capable of taking part in the reaction, are those of the general formula

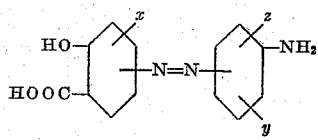

in which $x$, $y$ and $z$ have the meanings given above and the —$NH_2$ group occupies a meta- or para-position relatively to the azo linkage:

3-amino-4'-oxy-1:1'-azobenzene-5'-carboxylic acid,
3 - amino - 2' - methyl - 4' - oxy - 1:1' - azobenzene - 5'-carboxylic acid,
3 - amino - 3' - methyl - 4' - oxy - 1:1' - azobenzene - 5'-carboxylic acid,
3-amino-4'-oxy-1:1'-azobenzene-5'-carboxylic acid-6-sulphonic acid,
3-amino-4'-oxy-1:1'-azobenzene-5'-carboxylic acid-4-sulphonic acid,
3 - amino - 4 - methyl - 4' - oxy - 1:1' - azobenzene - 5'-carboxylic acid,
3 - amino - 6 - methyl - 4' - oxy - 1:1' - azobenzene - 5'-carboxylic acid,
3 - amino - 6 - methoxy - 4' - oxy - 1:1' - azobenzene - 5'-carboxylic acid,
3-amino-2':4'-dioxy-1:1'-azobenzene-5'-carboxylic acid,
3 - amino - 6 - chloro - 4' - oxy - 1:1' - azobenzene - 5'-carboxylic acid,
4-amino-4'-oxy-1:1'-azobenzene-5'-carboxylic acid,
4 - amino - 2' - methyl - 4' - oxy - 1:1' - azobenzene - 5'-carboxylic acid,
4 - amino - 3' - methyl - 4' - oxy - 1:1' - azobenzene - 5'-carboxylic acid,
4-amino-4'-oxy-1:1'-azobenzene-5'-carboxylic acid-5-sulphonic acid,
4-amino-4'-oxy-1:1'-azobenzene-5'-carboxylic acid-6-sulphonic acid,
4 - amino - 2 - methyl - 4' - oxy - 1:1' - azobenzene - 5'-carboxylic acid,
4 - amino - 3 - methyl - 4' - oxy - 1:1' - azobenzene - 5'-carboxylic acid,
4 - amino - 2 - methyl - 3' - methyl - 4' - oxy - 1:1' - azobenzene-5'-carboxylic acid,
4 - amino - 2 - methoxy - 4' - oxy - 1:1' - azobenzene - 5'-carboxylic acid,
4 - amino - 3 - ethoxy - 4' - oxy - 1:1' - azobenzene - 5'-carboxylic acid,
4 - amino - 2 - methyl - 5 - methoxy - 4' - oxy - 1:1' - azobenzene-5'-carboxylic acid,
4 - amino - 2:5 - dimethoxy - 4' - oxy - 1:1' - azobenzene-5'-carboxylic acid,
4 - amino - 2 - chloro - 4' - oxy - 1:1' - azobenzene - 5'-carboxylic acid,
4 - amino - 2 - nitro - 4' - oxy - 1:1' - azobenzene - 5'-carboxylic acid,
4-amino-4'-oxy-1:1'-azobenzene-2:5'-dicarboxylic acid,
4-amino-2':4'-dioxy-1:1'-azobenzene-5'-carboxylic acid, 4 - amino - 2 - methyl - 3' - chloro - 4' - oxy - 1:1' - azobenzene-5'-carboxylic acid, 4 - amino - 2 - methyl - 3' - nitro - 4' - oxy - 1:1' - azobenzene-5'-carboxylic acid, 4 - amino - 2 - methyl - 5 - methoxy - 4' - oxy - 1:1' - azobenzene-5'-carboxylic acid-3'-sulphonic acid, 4 - amino - 2 - methyl - 4' - oxy - 1:1' - azobenzene - 5'-carboxylic acid-3'-sulphonic acid, 4 - amino - 3 - methyl - 4' oxy - 1:1' - azobenzene - 5'-carboxylic acid-3'-sulphonic acid, 4 - amino - 2 - bromo - 4' - oxy - 1:1' - azobenzene - 5'-carboxylic acid-6-sulphonic acid, 4 - amino - 2:6 - dibromo - 4' - oxy - 1:1' - azobenzene-5'-carboxylic acid, 4 - amino - 2 - methyl - 5 - methoxy - 2' - oxy - 1:1' - azobenzene-3'-carboxylic acid, 4 - amino - 3 - methyl - 2' - oxy - 1:1' - azobenzene - 3'-carboxylic acid-5'-sulphonic acid, 4 - amino - 2 - methyl - 5 - methoxy - 5' - nitro - 2' - oxy-1:1'-azobenzene-3'-carboxylic acid, 4 - amino - 2 - methyl - 3' - oxy - 1:1' - azobenzene - 4'-carboxylic acid, 4 - amino - 3 - methyl - 3' - oxy - 1:1' - azobenzene - 4'-carboxylic acid.

The process of the invention also includes reacting a mixture of at least two different amino-azo-dyestuffs of the above general formula with a sulphonic acid chloride of phthalocyanine tetrasulphonic acid as defined above.

The reaction of the sulphonic acid chlorides of the phthalocyanine sulphonic acids with the aminoazodyestuffs is carried out in an aqueous medium and in the presence of at least one substance capable of binding mineral acid such, for example, as an alkali metal hydroxide, an alkaline earth metal hydroxide, an alkali metal carbonate, an alkaline earth metal carbonate, an alkali metal bicarbonate, magnesium oxide, sodium acetate, ammonia, ammonium carbonate, dimethyl-formamide, triethanolamine, pyridine or the like.

The reaction temperature is of minor importance and may vary within wide limits, but it is of advantage to work at a low temperature, advantageously within the range of 0–30° C.

Depending on the reaction temperature and the substance capable of binding mineral acid which are used, hydrolysis of the sulphonic acid chloride groups during the reaction, which can never be wholly avoided, can be checked to a greater or less degree. It is not absolutely necessary that all the sulphonic acid chloride groups should react with the amino-azo-dyestuff. It is often of advantage, with respect to its solubility that the dyestuff should contain one or more free sulphonic acid groups.

The various sulphochlorides used in the process may be reacted with at least one, and advantageously several, molecules of amino-azo-dyestuffs. Thus, for example, 1 molecular proportion of phthalocyanine tetrasulphonic acid chloride may be reacted with 1, 2, 3 or 4 molecular proportions of an amino-azo-dyestuff.

In many cases it is uncertain whether the sulphonic acid chloride groups are completely or only partially converted into the sulphonic acid amides of the invention.

Depending on the choice of the phthalocyanine sulphonic acid chloride used and on the number (1 to 4) of molecular proportions of amino-azo-dyestuff used for the reaction, there are obtained dyestuffs having different tinctorial properties. The greater the number of sulphonic acid groups in the dyestuff molecule the more pronounced is the substantive character of the dyestuff, and the greater the number of salicylic acid groups in the dyestuff molecule the more pronounced is the mordant character of the dyestuff, which causes a progressively increasing improvement in the properties of wet fastness. The dyestuffs yield green to olive tints which are in part distinguished by remarkable properties of wet fastness and excellent fastness to light.

The alkali metal salts of the azo-phthalocyanine dyestuffs of the invention are easily soluble in water, and are suitable for dyeing or printing vegetable, animal or wholly synthetic fibres, and also for dyeing oxidic protective coatings on aluminium.

Furthermore, if they contain a sufficient number of mordanting elements, the new dyestuffs can be fixed, according to known methods, on textile fibres by an aftertreatment with metal-yielding substances, if desired together with high molecular basic substances. Thus, in particular, green to olive dyeings having good fastness properties to washing and to light are obtained by aftertreating prints on fibres of cellulose or regenerated cellulose with copper-yielding substances together with high molecular basic condensation products.

The following examples illustrate the invention, the parts being by weight:

*Example 1*

96.9 parts (1/10 mol) of freshly prepared copperphthalocyanine tetrasulphochloride (crude product) obtained by reacting copper-phthalocyanine with chlorosulphonic acid, are discharged on to ice and the reaction product which separates out is mixed in the form of a moist paste with 300 parts of broken ice. A solution of 27.9 parts (1/10 mol) of the sodium salt of 3-amino-4'-oxy-1:1'-azobenzene-5'-carboxylic acid (obtained by the reaction of diazotized 3-nitraniline with salicylic acid followed by reduction of the nitro group with sodium sulphide) in 300 parts of water, to which has been added 30 parts of calcium carbonate, is rapidly added while stirring, and the whole is stirred well at 15–20° C. for 24 hours, then acidified with dilute hydrochloric acid until the reaction is acid to Congo, and the precipitated dyestuff acid is separated off, if desired, subjected to purification, and isolated in the form of its sodium salt.

The dyestuff so obtained is a dark grey powder which dissolves in water with a greenish blue coloration and in concentrated sulphuric acid with a yellow-green coloration and dyes pre-chromed cotton powerful green tints having good properties of wet fastness and very good fastness to light. In chrome printing on cotton there are produced green tints having good properties of fastness.

Instead of the sodium salt, the potassium, lithium or ammonium salt can be made with the same success.

By using, instead of 1/10 mol of 3-amino-4'-oxy-1:1'-azobenzene-5'-carboxylic acid, 2/10 mol, 3/10 mol or 4/10 mol of 3-amino-4'-oxy-1:1'-azobenzene-5'-carboxylic acid, there are obtained dyestuffs which exhibit different properties of wet fastness, for example, in chrome printing on cotton. Thus, as the number of salicylic acid groups in the dyestuff molecule increases the properties of wet fastness generally show a distinct improvement. Moreover, as the number of azo linkages in the dyestuff molecule increases the tint of the dyeing generally changes from blue-green towards yellow-green or towards olive.

Of special interest is the dyestuff obtained by reacting 3/10 mol of 3-amino-4'-oxy-1:1'-azobenzene-5'-carboxylic acid with 1/10 mol of copper-phthalocyanine tetrasulphochloride.

The sodium salt of this dyestuff of the formula

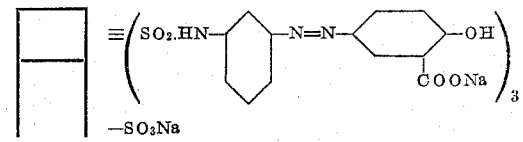

which is a derivative of copper-phthalocyanine-3:3':3'':3'''-tetrasulphonic acid, is a dark green dyestuff which dissolves in water with a green-blue coloration and in concentrated sulphuric acid with a yellow coloration. In chrome printing on cotton it yields green tints having very good properties of wet fastness and an excellent fastness to light.

Example 2

96.9 parts (1/10 mol) of copper phthalocyanine tetrasulphochloride, obtained as described in Example 1, are discharged on to ice, and the reaction product which separates is mixed in the form of a moist paste with 300 parts of broken ice, and a solution, heated to 60–70° C., of 83.7 parts (3/10 mol) of the sodium salt of 4-amino-4'-oxy-1:1'-azobenzene-5'-carboxylic acid (obtained by the reaction of diazotized 4-nitraniline with salicylic acid followed by reduction of the nitro group with sodium sulphide) in 2000 parts of water and 30 parts of sodium carbonate is rapidly added while stirring. The whole is allowed to stand at 60° C. for 2–3 hours, and then stirred for a further 24 hours at room temperature. After acidifying the mixture with dilute hydrochloric acid, the precipitated dyestuff acid is separated off, if desired, purified, and isolated in the form of its sodium salt.

The new dyestuff is a dark grey powder which dissolves in water with a green coloration and in concentrated sulphuric acid with a brown yellow coloration.

The dyestuff is suitable for dyeing cotton and viscose, and also for dyeing prechromed cotton and chromed wool. Green tints having good properties of wet fastness and very good fastness to light are obtained. In chrome printing on cotton green tints having very good properties of fastness are obtained.

Instead of 30 parts of sodium carbonate, there may be used with equal success 50 parts of potassium carbonate or 30 parts of ammonium carbonate.

Example 3

48.5 parts (1/20 mol) of copper-phthalocyanine tetrasulphochloride obtained as described in Example 1, are discharged on to ice and the reaction product which separates is mixed in the form of a moist paste with 200 parts of broken ice, and a solution, heated to 30° C., of 38.1 parts (3/10 mol) of the sodium salt of 3-amino-4'-oxy-1:1'-azobenzene-5'-carboxylic acid-6-sulphonic acid (obtained by the reaction of 3-nitraniline-6-sulphonic acid with salicylic acid followed by reduction of the amino group with sodium sulphide) in 300 parts of water and 10 parts of sodium hydroxide (100 percent) is rapidly added while stirring. The mixture is stirred for a further 24 hours at room temperature, the dyestuff acid is isolated by acidification with dilute hydrochloric acid, and the dyestuff acid is converted into its sodium salt, which is purified by repeated salting out.

The dyestuff so obtained is a dark grey powder which dissolves in water with a turquoise blue coloration and in concentrated sulphuric acid with a yellow green coloration.

The new dyestuff is suitable for dyeing cotton and viscose, and also for dyeing wool. It yields green tints possessing moderate properties of wet fastness and medium fastness to light. By after-chroming dyeings on cotton or wool, there are obtained substantially stronger green tints which are distinguished by good properties of wet fastness and very good fastness to light. In chrome printing on cotton there are obtained green tints having good properties of fastness.

Instead of 10 parts of sodium hydroxide (100 percent) there may be used 15 parts of potassium hydroxide (100 percent).

Example 4

48.5 parts (1/20 mol) of copper-phthalocyanine tetrasulphochloride are prepared in a manner analogous to that described in Example 1, and the paste so obtained is introduced rapidly into a solution of 76.2 parts (2/10 mol) of the sodium salt of 4-amino-4'-oxy-1:1-azobenzene-5'-carboxylic acid-6-sulphonic acid (obtained by the reaction of 4-nitraniline-6-sulphonic acid with salicylic acid followed by reduction of the nitro group with sodium sulphide) in 400 parts of water and 25 parts of pyridine, and the whole is stirred for 24 hours at 0–10° C. The dyestuff acid is separated off in the usual manner, freed from adherent impurities, and isolated in the form of its sodium salt.

The dyestuff so obtained is a dark grey powder which dissolves in water with a green coloration and in concentrated sulphuric acid with a yellow-brown coloration, and dyes nylon yellowish green tints. In chrome printing on cotton there are obtained yellowish green tints having good properties of fastness.

Instead of 25 parts of pyridine, there may be used with equal success 25 parts of dimethyl-formamide or 50 parts of triethanolamine.

In the examples given in the following table the procedure is the same as that given in Examples 1 to 4, and 1 molecular proportion of copper-phthalocyanine tetrasulphochloride, obtained as described in Example 1, is reacted with the amino-azo-dyestuffs given in the third column, the dyestuff being used in the proportion given in the second column.

| Example No. | Mols | Water-soluble salt of the amino-azo-dyestuff | Tint in chrome printing on cotton |
|---|---|---|---|
| 5 | 1 | 3 - amino - 2' - methyl - 4' - oxy - 1:1' - azobenzene - 5' - carboxylic acid. | bluish green. |
| 6 | 3 | ....do.... | green. |
| 7 | 1 | 3 - amino - 4' - oxy - 1:1' - azo - benzene - 5' - carboxylic acid - 4 - sulphonic acid. | Do. |
| 8 | 2 | ....do.... | Do. |
| 9 | 3 | ....do.... | yellowish green. |
| 10 | 1 | 3 - amino - 3' - methyl - 4' - oxy - 1:1' - azobenzene - 5' - carboxylic acid - 4 - sulphonic acid. | bluish green. |
| 11 | 3 | ....do.... | green. |
| 12 | 2 | 3 - amino - 4 - methyl - 4' - oxy - 1:1' - azobenzene - 5' - carboxylic acid. | grass green. |
| 13 | 2 | 3 - amino - 6 - methyl - 4' - oxy - 1:1' - azobenzene - 5' - carboxylic acid. | bluish green. |
| 14 | 1 | 3-amino - 6 - methoxy-4' - oxy - 1:1'-azobenzene-5'-carboxylic acid. | green. |
| 15 | 2 | ....do.... | Do. |
| 16 | 3 | ....do.... | Do. |
| 17 | 1 | 4 - amino - 3' - methyl - 4' - oxy - 1:1' - azobenzene - 5' - carboxylic acid. | Do. |
| 18 | 3 | ....do.... | grass green. |
| 19 | 1 | 4 - amino - 4' - oxy - 1:1' - azobenzene - 5' - carboxylic acid - 5 - sulphonic acid. | green. |
| 20 | 2 | ....do.... | yellowish green. |
| 21 | 3 | ....do.... | yellow green. |
| 22 | 1 | 4 - amino - 2 - methyl - 4' - oxy - 1:1' - azobenzene - 5' - carboxylic acid. | Do. |
| 23 | 3 | ....do.... | grass green. |
| 24 | 1 | 4 - amino - 2 - methoxy - 4' - oxy - 1:1' - azobenzene - 5' - carboxylic acid. | green. |
| 25 | 3 | ....do.... | olive green. |
| 26 | 1 | 4 - amino - 2:5 - diethoxy - 4' - oxy - 1:1' - azobenzene - 5' - carboxylic acid. | green. |
| 27 | 3 | ....do.... | Do. |
| 28 | 1 | 4 - amino - 2 - chloro - 4' - oxy - 1:1 - azobenzene - 5 - carboxylic acid. | Do. |
| 29 | 3 | ....do.... | yellowish green. |
| 30 | 1 | 4 - amino - 2 - nitro - 4' - oxy - 1:1' - azobenzene - 5' - carboxylic acid. | bluish olive. |
| 31 | 3 | ....do.... | olive. |
| 32 | 1 | 4 - amino - 4' - oxy - 1:1' - azobenzene - 2:5' - dicarboxylic acid. | turquoise blue. |
| 33 | 3 | ....do.... | blue green. |
| 34 | 1 | 4 - amino - 2 - methyl - 4' - oxy - 1:1' - azobenzene - 5' - carboxylic acid - 3' - sulphonic acid. | green. |
| 35 | 3 | ....do.... | yellow green. |
| 36 | 1 | 4 - amino - 3 - methyl - 4' - oxy - 1:1' - azobenzene - 5' - carboxylic acid - 3' - sulphonic acid. | jade green. |
| 37 | 3 | ....do.... | yellowish green. |
| 38 | 1 | 4 - amino - 2 - methyl - 5 - methoxy - 4' - oxy - 1:1' - azobenzene - 5' - carboxylic acid - 3' - sulphonic acid. | bluish green. |
| 39 | 3 | ....do.... | olive green. |
| 40 | 2 | 4 - amino - 2 - bromo - 4' - oxy - 1:1' - azobenzene - 5' - carboxylic acid - 6 - sulphonic acid. | green. |
| 41 | 1 | 4 - amino - 2 - methyl - 5 - methoxy - 2' - oxy - 1:1' - azobenzene - 3' - carboxylic acid. | bluish green. |
| 42 | 3 | ....do.... | olive. |

Example 43

48.5 parts (1/20 mol) of copper-phthalocyanine-4:4′:4″:4‴-tetrasulphochloride, obtained by the action of chlorosulphonic acid on copper - phthalocyanine - 4:4′:4″:4‴ - tetrasulphonic acid, are well mixed with 250 parts of broken ice, and a solution of 55.8 parts (2/10 mol) of the sodium salt of 3-amino-4′-oxy-1:1′-azobenzene-5′-carboxylic acid in 300 parts of water and 35 parts of sodium acetate is rapidly added while stirring. The whole is maintained at 20–25° C. for about 60 hours, while stirring. The reaction mixture is rendered weakly acid with dilute hydrochloric acid, and the precipitated dyestuff acid is separated off, dissolved hot in water and sodium carbonate, and isolated in the form of its sodium salt by salting out with sodium chloride.

The resulting dyestuff is a dark grey powder which dissolves in water with a green coloration and in sulphuric acid with a dirty yellow coloration.

The new dyestuff is suitable for dyeing cotton, viscose, wool and natural silk. By after-treatment with a metal salt the properties of wet fastness are in part substantially improved. In chrome printing on cotton there is obtained a bright green tint having very good properties of wet fastness and an excellent fastness to light.

The same dyestuff having the same tinctorial properties is obtained by working, for example, at 0–10° C. or 50–60° C. or 80–90° C., instead of at 20–25° C. as in this example.

Example 44

97 parts (1/10 mol) of copper-phthalocyanine-4:4′:4″:4‴-tetrasulphochloride, obtained by the action of chlorosulphonic acid on copper - phthalocyanine - 4:4′:4″:4‴ - tetrasulphonic acid, are stirred with 400 parts of broken ice and 150 parts of water to a homogeneous paste, the latter is rendered neutral with calcium carbonate, and then a solution of 83.7 parts (3/10 mol) of the sodium salt of 3-amino-4′-oxy-1:1′-azobenzene-5′-carboxylic acid in 1000 parts of water, to which 40 parts of calcium carbonate have been added, is added rapidly while stirring. The whole is stirred for 10 hours at 5–15° C. and then for a further 24 hours at room temperature. When the reaction has finished the precipitated dyestuff is filtered off with suction and pasted with 400 parts of water, then acidified with 400 parts of concentrated sulphuric acid, isolated, taken up in 300 parts of water, brought into solution with sodium carbonate, filtered, and the filtrate is salted out with 300 parts of sodium chloride. The dyestuff which is separated in the form of its sodium salt is dried and extracted with alcohol for further purification.

The resulting dye-stuff of the formula

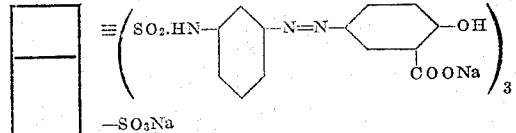

which is a derivative of copper-phthalocyanine-4:4′:4″:4‴-tetrasulponic acid, is a blue-black powder which dissolves in water with a green blue coloration and in concentrated sulphuric acid with a yellow olive coloration. It is suitable more especially for chrome printing on cotton. There are obtained full green tints having excellent properties of fastness and a remarkable fastness to light.

By using only 2/10 mol, instead of 3/10 mol, of 3-amino-4′-oxy-1:1′-azobenzene-5′-carboxylic acid, there is obtained a dyestuff of the formula

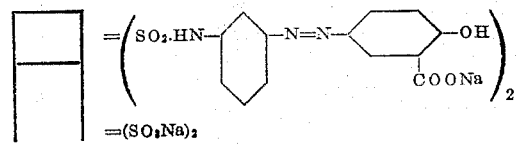

which is a derivative of copper-phthalocyanine-4:4′:4″:4‴-tetrasulphonic acid.

The sodium salt of this dyestuff is a blue-black powder which dissolves in water with a blue green coloration and in concentrated sulphuric acid with a yellow-olive coloration. In chrome printing on cotton there are obtained full bluish green tints having very good properties of wet fastness and a remarkable fastness to light.

Example 45

48.5 parts (1/20 mol) of copper phthalocyanine-4:4′:4″:4‴-tetrasulphochloride, obtained as described in Example 43, are mixed with 250 parts of broken ice and a solution of 27.9 parts (1/10 mol) of the sodium salt of 4-amino-4′-oxy-1:1′-azobenzene-5′-carboxylic acid in 600 parts of water and 25 parts of magnesium carbonate is rapidly added while stirring, and the mixture is stirred for 60 hours at 20–30° C. The dyestuff is isolated and worked up in the manner described in Example 43.

The resulting dyestuff is a dark grey powder which dissolves in water with a green coloration and in concentrated sulphuric acid with a greenish yellow coloration. The dyestuff dyes chromed cotton powerful green tints and dyes after-chromed wool green tints which are very fast to light.

In chrome printing on cotton a strong green tint having good properties of fastness is obtained. Instead of 25 parts of magnesium carbonate, there may be used 12 parts of magnesium oxide, 30 parts of calcium carbonate or 60 parts of barium carbonate.

Example 46

48.5 parts (1/20 mol) of copper-phthalocyanine-4:4′:4″:4‴-tetrasulphochloride are stirred with ice and water to form a homogeneous paste. A solution of 57.1 parts (3/20 mol) of the sodium salt of 3-amino-4′-oxy-1:1′-azobenzene-5′-carboxylic acid-6-sulphonic acid in 400 parts of water and 25 parts of ammonia solution of 20 percent strength is then added, and the whole is stirred for 60 hours at 0–5° C. The reaction product is salted out directly with sodium chloride, the precipitated dyestuff is separated off, and is isolated in the form of its sodium salt by reprecipitation twice.

The dyestuff so obtained is a dark green powder which dissolves in water with a green coloration and in concentrated sulphuric acid with a greenish-yellow coloration, and dyes chromed cotton bright bluish green tints having good properties of wet fastness and a very good fastness to light.

In chrome printing on cotton strong green tints having good properties of wet fastness and a very good fastness to light are obtained.

The dyestuff produces a clear green tint on anodically oxidized aluminum.

Instead of 25 parts of ammonia solution of 25 percent strength, there may be used with equal success 10 parts of sodium hydroxide (100 percent) or 15 parts of potassium hydroxide (100 percent).

Example 47

48.5 parts (1/20 mol) of copper-phthalocyanine-4:4′:4″:4‴-tetrasulphochloride are mixed well with 250 parts of ice, the resulting paste is given a pH value of 6.9 by means of an ice-cold dilute solution of caustic soda, and a solution of 57.1 parts (3/20 mol) of the sodium salt of 4 - amino - 4′ - oxy - 1:1′ - azobenzene - 5′ - carboxylic acid-6-sulphonic acid in 400 parts of water and 20 parts of sodium bicarbonate is rapidly added. The whole is heated while stirring well to 40° C., this temperature is maintained for a few hours, and the mixture is stirred at room temperature for a further 50–60 hours. The dyestuff is salted out by means of sodium chloride from a solution which is alkaline to litmus, and the dyestuff is purified.

The resulting dyestuff is a blue-grey powder which dissolves in water with a green coloration and in concentrated sulphuric acid with a yellow-brown coloration, and in chrome printing on cotton produces yellowish green tints having good properties of fastness.

Instead of 20 parts of sodium bicarbonate, there may be used 15 parts of sodium carbonate or 25 parts of potassium carbonate.

In the examples given in the following table the procedure is similar to that described in Examples 43–47, and 1 mol of copper-phthalocyanine-4:4':4'':4'''-tetrasulphochloride, obtained as described in Example 43, is reacted with the amino-azo-dyestuffs given in column 3, the quantity of the dyestuff being given in column 2.

| Example | Mols | Water-soluble salt of the amino-azo-dyestuff | Tint in chrome printing on cotton |
|---|---|---|---|
| 48 | 1 | 3-amino-4-methyl-4'-oxy-1:1'-azobenzene-5'-carboxylic acid. | bluish green. |
| 49 | 2 | ‒‒‒‒do‒‒‒‒ | green. |
| 50 | 3 | ‒‒‒‒do‒‒‒‒ | yellowish green. |
| 51 | 4 | ‒‒‒‒do‒‒‒‒ | yellow green. |
| 52 | 1 | 3-amino-6-methyl-4'-oxy-1:1'-azobenzene-5'-carboxylic acid. | grass green. |
| 53 | 2 | ‒‒‒‒do‒‒‒‒ | yellowish green. |
| 54 | 3 | ‒‒‒‒do‒‒‒‒ | yellow green. |
| 55 | 2 | 3-amino-4'-oxy-1:1'-azobenzene-5'-carboxylic acid-4-sulphonic acid. | Do. |
| 56 | 2 | 4-amino-4'-oxy-1:1'-azobenzene-5'-carboxylic acid-5-sulphonic acid. | Do. |
| 57 | 3 | 4-amino-2-methoxy-4'-oxy-1:1'-azobenzene-5'-carboxylic acid. | olive green. |
| 58 | 1 | 4-amino-2-chloro-4'-oxy-1:1'-azobenzene-5'-carboxylic acid. | bluish green. |
| 59 | 1 | 4-amino-2-methyl-5-methoxy-5'-nitro-2'-oxy-1:1'-azobenzene-3'-carboxylic acid. | blue green. |
| 60 | 1 | 4-amino-2-methyl-3'-oxy-1:1'-azobenzene-4'-carboxylic acid. | Do. |
| 61 | 2 | 4-amino-2:6-dibrom-4'-oxy-1:1'-azobenzene-5'-carboxylic acid. | Do. |
| 62 | 3 | 4-amino-2-nitro-4'-oxy-1:1'-azobenzene-5'-carboxylic acid. | olive green. |
| 63 | 3 | 4-amino-2-bromo-4'-oxy-1:1'-azobenzene-5'-carboxylic acid-6-sulphonic acid. | green. |
| 64 | 4 | 4-amino-2':4'-dioxy-1:1'-azobenzene-5'-carboxylic acid. | olive green. |

*Example 65*

An ice-cold paste of 45.7 parts (1/20 mol) of copper-phthalocyanine - monosulphochloride - trisulphonic acid (obtained by partial hydrolysis of the copper phthalocyanine-4:4':4'':4'''-tetrasulphochloride described in Example 43) is mixed at 0–5° C. with a solution of 14 parts (1/20 mol) of the sodium salt of 4-amino-4'-oxy-1:1'-azobenzene-5'-carboxylic acid in 400 parts of water and 15 parts of sodium carbonate. The whole is stirred for 24 hours at 0–5° C., and the dyestuff is isolated in the usual manner.

The dyestuff so obtained is a dark grey powder which dissolves in water with a green coloration and in concentrated sulphuric acid with a yellow-brown coloration.

In chrome printing on cotton the dyestuff yields green tints having good properties of fastness.

*Example 66*

64 parts (1/20 mol) of brominated copper-phthalocyanine-4:4':4'':4'''-tetrasulphochloride, obtained by the action of chlorosulphonic acid and thionyl chloride on brominated copper phthalocyanine-4:4':4'':4'''-tetrasulphonic acid (containing 9.4 percent of bromine by analysis), are discharged on to ice, and the reaction product is filtered off with suction and mixed with 250 parts of broken ice. There is then added rapidly, while stirring, a solution of 42 parts (3/20 mol) of the sodium salt of 3-amino-4'-oxy-1:1'-azobenzene-5'-carboxylic acid in 300 parts of water to which have been added 20 parts of calcium carbonate. The whole is stirred at room temperature for 50 hours and the dyestuff is isolated as its sodium salt.

The dyestuff so obtained is a dark green powder which dissolves in water with a bluish green coloration and in concentrated sulphuric acid with an olive coloration, and in chrome printing on cotton yields strong green tints having very good properties of fastness.

*Example 67*

A moist paste of copper-phthalocyanine tetrasulphochloride, which has been obtained by reacting chlorosulphonic acid with 45 parts (1/20 mol) of copper-phthalocyanine tetrasulphonic acid (obtained by the sulphonation of copper-phthalocyanine with oleum), discharging the mixture on to broken ice and separating the reaction product, is mixed with 100 parts of ice and 100 parts of water. There is added rapidly, while stirring, a solution of 42 parts (3/20 mol) of the sodium salt of 4-amino-4'-oxy-1:1'-azobenzene-5'-carboxylic acid in 1000 parts of water and 15 parts of calcium carbonate, and the whole is stirred for 30 hours at 0–5° C. The dyestuff is separated from its solution by the usual methods and isolated as its sodium salt. The dyestuff so obtained is a dark grey powder which dissolves in water with a greenish blue coloration and in concentrated sulphuric acid with a yellow-green coloration, and is identical in its tinctorial properties with the dyestuff described in Example 2.

*Example 68*

24.2 parts (1/40 mol) of copper-phthalocyanine tetrasulphochloride, obtained as described in Example 1, are discharged on to ice and the sulphochloride which separates out is stirred in the form of a moist paste with 150 parts of broken ice. There is then added rapidly while stirring a solution of 22.2 parts (3/40 mol) of the sodium salt of 4-amino-2':4'-dioxy-1:1'-azobenzene-5'-carboxylic acid (obtained by coupling diazotized para-amino-acetanilide with 2:4-dioxybenzoic acid followed by hydrolysis), in 400 parts of water and 15 parts of magnesium carbonate, and the whole is stirred for 24 hours at room temperature. The dyestuff is isolated by acidification with dilute hydrochloric acid, is purified by reprecipitation and washing, and isolated as its sodium salt.

The dyestuff so obtained is a dark grey powder which dissolves in water with a dark green coloration and in concentrated sulphuric acid with a yellow brown coloration.

The new dyestuff dyes cotton directly strong greenish grey tints and dyes chromed cotton strong grey-green tints. It dyes nylon olive brown tints and anodically oxidised aluminum green tints. In chrome printing on cotton there are produced olive tints having remarkable properties of fastness.

*Example 69*

96.0 parts (1/10 mol) of copper-phthalocyanine tetrasulphochloride, obtained as described in Example 1, are mixed in the form of a moist paste with 350 parts of broken ice, and there is rapidly added a solution of 27.9 parts (1/10 mol) of the sodium salt of 4-amino-4'-oxy-1:1'-azobenzene-5-carboxylic acid, 29.3 parts (1/10 mol) of the sodium salt of 3-amino-2'-methyl-4'-oxy-1:1'-azobenzene-5'-carboxylic acid (obtained by coupling diazotized 3-nitraniline with 4-methyl-2-oxybenzoic acid followed by reduction with sodium sulphide) in 2000 parts of water and 30 parts of sodium carbonate, and the whole is stirred for 30 hours at 0° C. The isolation and working up of the azo-phthalocyanine dyestuff are carried out as described in Example 2.

The dyestuff so obtained is a greenish dark grey powder which dissolves in water with a blue green coloration and in concentrated sulphuric acid with a brown yellow coloration, and in chrome printing on cotton yields bright green tints having very good properties of fastness.

*Example 70*

29 parts (3/100 mol) of nickel-phthalocyanine tetrasulphochloride, obtained by the action of chlorosulphonic acid on nickel-phthalocyanine, are discharged on to ice and the separated reaction product is mixed in the form of a moist paste with 150 parts of broken ice, and a solution of 25.1 parts (9/100 mol) of the sodium salt of 3-amino-4'-oxy-1:1'-azobenzene-5-carboxylic acid in 300 parts of water and 15 parts of calcium carbonate is added. The whole is stirred for 24 hours at 0–5° C., the reaction mixture is rendered weakly alkaline with sodium carbonate while heating the mixture to 50° C., the mixture is filtered to remove calcium carbonate, and the dyestuff is salted out with the sodium chloride.

The resulting dyestuff of the formula

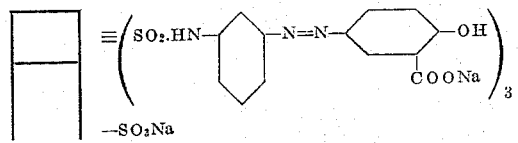

which is a derivative of nickel-phthalocyanine-3:3':3":3'''-tetrasulphonic acid, is a dark grey powder which dissolves in water with a green coloration and in concentrated sulphuric acid with a greenish yellow coloration.

The new dyestuff is suitable for dyeing chromed cotton, whereby strong green tints of good fastness to light are obtained. In chrome printing on cotton bright green tints having very good properties of wet fastness and good fastness to light are obtained.

By using only 3/100 mol, instead of 9/100 mol, of the sodium salt of 3-amino-4'-oxy-1:1'-azobenzene-5'-carboxylic acid there is obtained a dyestuff having a somewhat more bluish tint and distinctly lower properties of wet fastness.

The examples given in the following table were carried out as described in Example 69 by reacting 1 mol of nickel-phthalocyanine tetrasulphochloride, obtained as described in Example 69, with the aminoazo-dyestuff given in column 3, the quantity of the dyestuff being given in column 2.

| Example | Mols | Water-soluble salt of the amino-azo-dyestuff | Tint in chrome printing on cotton |
|---|---|---|---|
| 71 | 1 | 3-amino-4'-oxy-1:1'-azobenzene-5'-carboxylic acid-4-sulphonic acid. | blue green. |
| 72 | 3 | ...do... | yellow green. |
| 73 | 1 | 3-amino-6-methoxy-4'-oxy-1:1'-azobenzene-5'-carboxylic acid. | green. |
| 74 | 3 | ...do... | olive green. |
| 75 | 1 | 4-amino-2-chloro-4'-oxy-1-1'-azobenzene-5'-carboxylic acid. | blue green. |
| 76 | 3 | ...do... | green. |

*Example 77*

96.4 parts (1/10 mol) of nickel phthalocyanine-4:4':4":4'''-tetrasulphochloride, obtained by the action of chlorosulphonic acid on nickel-phthalocyanine-4:4':4":4'''- tetrasulphonic acid, are mixed well with 350 parts of broken ice, and there is added rapidly while stirring a solution of 83.7 parts (3/10 mol) of the sodium salt of 3-amino-4'-oxy-1:1'-azobenzene-5'-carboxylic acid in 500 parts of water, to which is added 30 parts of calcium carbonate, and the mixture is stirred for about 50 hours at 25° C. The reaction mixture is rendered weakly acid with dilute hydrochloric acid, the precipitated dyestuff acid is separated off, and dissolved in water and sodium carbonate, and the dyestuff is salted out.

The dyestuff so obtained is a blue-black powder which dissolves in water with a blue green coloration and in concentrated sulphuric acid with a yellow olive coloration.

The new dyestuff yields in chrome printing on cotton full green tints having excellent properties of fastness.

*Example 78*

48.3 parts (1/20 mol) of freshly prepared cobaltphthalocyanine tetrasulphochloride, obtained by the action of chlorosulphonic acid on cobalt-phthalocyanine, are discharged on to ice, and the reaction product is separated and mixed in the form of a moist paste with 250 parts of broken ice. There is then added rapidly to a solution of 41.7 parts (3/20 mol) of the sodium salt of 3-amino-4'-oxy-1:1'-azobenzene-5'-carboxylic acid in 400 parts of water and 20 parts of calcium carbonate, and the mixture is stirred for 3 hours at 30–40° C. and then at room temperature for a further 24 hours. The dyestuff is isolated as described in Example 69.

The resulting dyestuff is a blue-grey powder which dissolves in water with a greenish blue coloration and in concentrated sulphuric acid with a green yellow coloration.

In chrome printing on cotton there are obtained strong green tints having very good properties of wet fastness and an excellent fastness to light. The dyestuff yields an anodically oxidized aluminum intense green tints.

Instead of calcium carbonate, there may be used other alkalis.

*Example 79*

48.3 parts (1/20 mol) of cobalt-phthalocyanine tetrasulphochloride, obtained as described in Example 78, are mixed with 250 parts of broken ice, and there is added rapidly a solution of 32.4 parts (1/10 mol) of the sodium salt of 4-amino-2'-nitro-4'-oxy - 1:1' - azobenzene-5'-carboxylic acid (obtained by coupling diazotized 4-acetyl-amino-2-nitraniline with salicylic acid followed by hydrolysis) in 1000 parts of water and 20 parts of calcium carbonate. The whole is stirred for 15 hours at room temperature and the dyestuff is isolated in the usual manner.

The dyestuff so obtained is a dark grey powder which dissolves in water with an olive green coloration and in concentrated sulphuric acid with a grey-brown coloration, and yields in chrome printing on cotton interesting green tints having good properties of fastness.

By using in this example, instead of 4-amino-2-nitro-4'-oxy-1:1'-azobenzene-5'-carboxylic acid, a corresponding quantity of 4-amino-2-chloro-4'-oxy-1:1'-azobenzene-5'-carboxylic acid or 3-amino-4'-oxy-1:1'-azobenzene-5'-carboxylic acid 6-sulphonic acid, there are obtained dyestuffs which yield similar tints and possess good properties of fastness.

*Example 80*

96.5 parts (1/10 mol) of cobalt - phthalocyanine-4:4':4":4'''-tetrasulphochloride, obtained by the action of chlorosulphonic acid on cobalt-phthalocyanine-4:4':4":4'''-tetrasulphonic acid, are introduced rapidly in the form of a moist paste at 10° C. into a solution of 29.3 parts (3/10 mol) of the sodium salt of 3-amino-2'-methyl-4'-oxy-1:1'-azobenzene-5'-carboxylic acid in 800 parts of water and 45 parts of potassium hydroxide (100 percent). The whole is stirred for 50 hours at 10° C., and the dyestuff is isolated in the usual manner.

The dyestuff is a dark grey powder which dissolves in water with a blue green coloration and in concentrated sulphuric acid with a greenish yellow coloration.

In chrome printing on cotton it yields bright green tints having good properties of fastness.

*Example 81*

48.1 parts (1/20 mol) of iron-phthalocyanine tetrasulphochloride, obtained by the action of chlorosulphonic acid on iron-phthalocyanine, are mixed well with 250 parts of broken ice, and there is added while stirring a solution of 57.1 parts (3/20 mol) of the sodium salt of 3-amino-4'-oxy-1:1'-azobenzene-5'-carboxylic acid-6-sulphonic acid in 400 parts of water and 15 parts of potassium hydroxide (100 percent). The whole is stirred at room temperature for 24 hours and the dyestuff is isolated in the form of its potassium salt.

The dyestuff is a dark grey powder which dissolves in water with a green coloration and in concentrated sulphuric acid with a brownish yellow coloration.

The dyestuff dyes anodically oxidized aluminum green tints.

In chrome printing on cotton this new dyestuff yields olive green tints.

By using, instead of 3/20 mol of 3-amino-4'-oxy-1:1'-azobenzene-5'-carboxylic acid-6-sulphonic acid, 3/20 mol of 3-amino-4'-oxy-1:1'-azobenzene - 5' - carboxylic acid there is obtained a dyestuff which dyes cotton in chrome printing olive green tints.

*Example 82*

24.1 parts (1/40 mol) of iron-phthalocyanine-tetrasulphochloride, obtained as described in Example 81, are mixed with 150 parts of broken ice, and the whole is introduced rapidly into a solution of 30.9 parts (1/10 mol) of the sodium salt of 4-amino-3-methoxy-4'-oxy-1:1'-azobenzene-5'-carboxylic acid in 800 parts of water, to which 15 parts of magnesium carbonate are added. The whole is stirred for 40 hours at 5-10° C. and the dyestuff is isolated in the usual manner. The dyestuff is a dark grey powder which dissolves in water with an olive green coloration and in concentrated sulphuric acid with a violet brown coloration.

In chrome printing on cotton it yields olive brown tints.

By using 1/10 mol of 4-amino-2':4'-dioxybenzene-1:1'-azobenzene-5'-carboxylic acid, instead of 4 - amino - 3 - methoxy-4'-oxy-1:1'-azobenzene-5'-carboxylic acid, there is obtained a dyestuff which dyes cotton in chrome printing olive green tints.

*Example 83*

96.2 parts (1/10 mol) of iron - phthalocyanine-4:4':4'':4'''-tetrasulphochloride, obtained by the action of chlorosulphonic acid on iron-phthalocyanine-4:4':4'':4'''-tetrasulphonic acid, are introduced in the form of a moist paste into a solution of 51.4 parts (2/10 mol) of the sodium salt of 4-amino-4'-oxy-1:1'-azobenzene-5'-carboxylic acid in 1000 parts of water and 30 parts of sodium carbonate. The whole is stirred for 60 hours at 20-25° C. and the dyestuff is isolated in the usual manner.

The dyestuff is a dark grey powder which dissolves in water with a yellow-green coloration and in concentrated sulphuric acid with a red-brown coloration, and dyes cotton in chrome printing olive tints.

*Example 84*

47.9 parts (1/20 mol) of chromium-phthalocyanine tetrasulphochloride, obtained by the action of chlorosulphonic acid on chromium phthalocyanine, are discharged on to ice, and the precipitated reaction product is mixed in the form of a moist paste with 200 parts of ice, and there is rapidly added a solution of 41.8 parts (2/20 mol) of the sodium salt of 3-amino-4'-oxy-1:1'-azobenzene-5'-carboxylic acid in 400 parts of water and 10 parts of sodium hydroxide (100 percent). The whole is then stirred at 10-20° C. for 24 hours.

The dyestuff is isolated in the form of its sodium salt in the usual manner.

The dyestuff so obtained is a grey green powder which dissolves in water with a green coloration and in concentrated sulphuric acid with a yellow coloration, and dyes cotton in chrome printing yellow-green tints having very good properties of wet fastness.

*Example 85*

95.8 parts (1/10 mol) of chromium-phthalocyanine tetrasulphochloride, obtained as described in Example 84, are mixed in the form of a moist paste with 200 parts of ice and 200 parts of water, and there is rapidly added a solution of 73.6 parts (2/10 mol) of the sodium salt of 4 - amino - 2 - methyl - 5 - methoxy - 2' - oxy - 5' - nitro-1:1'-azo-benzene-3'-carboxylic acid (obtained by coupling diazotized 5-nitro-3-amino-2-oxybenzoic acid in acetic acid with 5-methyl-2-methoxy aniline) in 1200 parts of water and 30 parts of sodium carbonate. The whole is stirred for 24 hours at room temperature, and the dyestuff is isolated in the usual manner.

The dyestuff so obtained is a dark grey powder which dissolves in water with a green coloration and in concentrated sulphuric acid with a red-brown coloration, and dyes cotton in chrome printing olive green tints.

*Example 86*

47.9 parts (1/20 mol) of chromium phthalocyanine-4:4':4'':4'''-tetrasulphochloride, obtained by the action of chlorosulphonic acid on chromium - phthalocyanine-4:4':4'':4'''-tetrasulphonic acid, are discharged on to ice, and the precipitated reaction product is rapidly added in the form of a moist paste to a solution of 42 parts (3/20 mol) of the sodium salt of 3-amino-4'-oxy-1:1'-azobenzene-5'-carboxylic acid in 300 parts of water, to which have been added 20 parts of calcium carbonate. The whole is first maintained at 10° C. for 10 hours and then stirred for 40 hours at 20-25° C. The dyestuff is isolated in the usual manner in the form of its sodium salt.

The dyestuff so obtained is a dark green powder which dissolves in water with a green coloration and in sulphuric acid with a yellow-brown coloration.

The new dyestuff yields in chrome printing on cotton olive green tints having very good properties of fastness.

*Example 87*

93.3 parts (1/10 mol) of aluminium-phthalocyanine tetrasulphochloride, obtained by the action of chlorosulphonic acid on aluminium-phthalocyanine, are discharged on to ice, and the isolated reaction product is mixed in the form of a moist paste with 400 parts of broken ice, and there is rapidly added a solution of 83.7 parts (3/10 mol) of the sodium salt of 3-amino-4'-oxy-1:1'-azobenzene-5'-carboxylic acid in 500 parts of water and 20 parts of sodium hydroxide (100 percent). The whole is stirred for 24 hours at 20° C. The resulting solution mixed with sodium chloride, and the precipitated dyestuff is isolated and purified by being salted out twice.

The dyestuff so obtained is a greenish dark grey powder which dissolves in water with a green coloration and in concentrated sulphuric acid with a green-yellow coloration, and dyes cotton in chrome printing bright green tints having very good properties of wet fastness.

The dyestuff yields on anodically oxidised aluminium a beautiful bluish green tint.

Instead of 3-amino-4'-oxy-1:1'-azobenzene-5'-caroxylic acid, there may be used with equal success 3-amino-4'-oxy-1:1'-azobenzene-5'-carboxylic acid-6-sulphonic acid.

*Example 88*

28 parts (3/100 mol) of aluminium-phthalocyanine-4:4':4'':4'''-tetrasulphochloride, obtained by the action of chlorosulphonic acid on aluminium-phthalocyanine-4:4':4'':4'''-tetrasulphonic acid, are stirred with 150 parts of broken ice and 200 parts of water. To the resulting paste is added a solution of 23.1 parts (9/100 mol) of the sodium salt of 4-amino-4'-oxy-1:1'-azobenzene-5'-carboxylic acid in 700 parts of water and 20 parts of potassium carbonate, and the whole is stirred for 50 hours at room temperature. The dyestuff is isolated in the usual manner.

The dyestuff is a greenish dark grey powder which dissolves in water with a yellow green coloration and in concentrated sulphuric acid with a brown coloration, and dyes cotton in chrome printing green tints.

The expression "oxy" means throughout the specification "hydroxyl."

What we claim is:

1. A process for the manufacture of water-soluble mordant azo-phthalocyanine dyestuffs comprising the step of condensing one molecular proportion of a phthalocyanine sulphochloride of the general formula

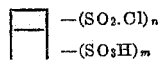

in which A represents a metal-containing phthalocyanine nucleus, in which the —SO₂Cl and —SO₃H groups are present in one of the 3- and 4-positions, said metal being selected from the group consisting of copper, cobalt, nickel, iron, chromium and aluminum, $n$ stands for an integer from 1 to 4 inclusive, and $m$ is a numeral from 0 to 3 inclusive, the sum of $m+n$ being equal to 4, in an aqueous medium and in the presence of a mineral acid binding agent with one to four molecular proportions of at least one amino-azo-dyestuff of the general formula

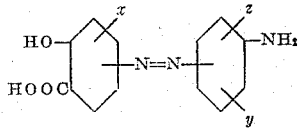

in which $x$ stands for a member selected from the group consisting of hydrogen, chlorine, bromine, a methyl, hydroxyl, nitro and sulphonic acid group, $y$ stands for a member selected from the group consisting of hydrogen, chlorine, bromine, an alkyl, alkoxy, nitro, sulphonic acid and carboxylic acid group and $z$ stands for a member selected from the group consisting of hydrogen, chlorine, bromine, an alkyl and alkoxy group.

2. A process for the manufacture of water-soluble mordant azo-phthalocyanine dyestuffs comprising the step of condensing one molecular proportion of a phthalocyanine sulphochloride of the general formula

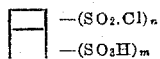

in which A represents a metal-containing phthalocyanine nucleus, in which the —SO₂Cl and —SO₃H groups are present in one of the 3- and 4-positions, said metal being selected from the group consisting of copper, cobalt, nickel, iron, chromium and aluminum, $n$ stands for an integer from 2 to 4 inclusive, and $m$ is a numeral from 0 to 2 inclusive, the sum of $m+n$ being equal to 4, in an aqueous medium and in the presence of a mineral acid binding agent with 2 to 4 molecular proportions of at least one amino-azo dyestuff of the general formula

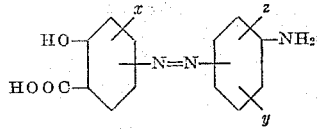

in which $x$ stands for a member selected from the group consisting of hydrogen, chlorine, bromine, a methyl, hydroxyl, nitro and sulphonic acid group, $y$ stands for a member selected from the group consisting of hydrogen, chlorine, bromine, an alkyl, alkoxy, nitro, sulphonic acid and carboxylic acid group and $z$ stands for a member selected from the group consisting of hydrogen, chlorine, bromine, an alkyl and alkoxy group.

3. A process for the manufacture of water-soluble mordant azo-phthalocyanine dyestuffs comprising the step of condensing one molecular proportion of a phthalocyanine sulphochloride of the general formula

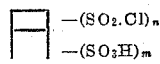

in which A represents a metal-containing phthalocyanine nucleus, in which the —SO₂Cl and —SO₃H groups are present in one of the 3- and 4-positions, said metal being selected from the group consisting of copper, cobalt, nickel, iron, chromium and aluminum, $n$ stands for an integer from 2 to 4 inclusive, and $m$ is a numeral from 0 to 2, the sum of $m+n$ being equal to 4, in an aqueous medium and in the presence of a mineral acid binding agent with 2 to 4 molecular proportions of at least one amino-azo-dyestuff of the formula

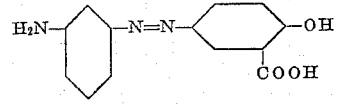

4. A process for the manufacture of a water-soluble mordant azo-phthalocyanine dyestuff comprising the step of condensing one molecular proportion of copper phthalocyanine-3:3′:3″:3‴-tetrasulphochloride in an aqueous medium and in the presence of a mineral acid binding agent with 3 molecular proportions of 3-amino-4′-hydroxy-1:1′-azobenzene-5′-carboxylic acid.

5. A process for the manufacture of a water-soluble mordant azo-phthalocyanine dyestuff comprising the step of condensing one molecular proportion of copper phthalocyanine-4:4′:4″:4‴-tetrasulphochloride in an aqueous medium and in the presence of a mineral acid binding agent with 3 molecular proportions of 3-amino-4′-hydroxy-1:1′-azobenzene-5′-carboxylic acid.

6. A process for the manufacture of a water-soluble mordant azo-phthalocyanine dyestuff comprising the step of condensing one molecular proportion of copper phthalocyanine-4:4′:4″:4‴-tetrasulphochloride in an aqueous medium and in the presence of a mineral acid binding agent with 2 molecular proportions of 3-amino-4′-hydroxy-1:1′-azobenzene-5′-carboxylic acid.

7. A process for the manufacture of a water-soluble mordant azo-phthalocyanine dyestuff comprising the step of condensing one molecular proportion of nickel phthalocyanine-3:3′:3″:3‴-tetrasulphochloride in an aqueous medium and in the presence of a mineral acid binding agent with 3 molecular proportions of 3-amino-4′-hydroxy-1:1′-azobenzene-5′-carboxylic acid.

8. Water-soluble mordant azo-phthalocyanine dyestuffs corresponding to the general formula

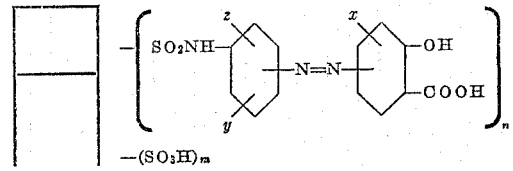

in which A represents a metal-containing phthalocyanine nucleus, in which the —SO₂.NH and —SO₃H groups are present in one of the 3- and 4-positions, said metal being selected from the group consisting of copper, cobalt, nickel, iron, chromium and aluminum, $n$ stands for an integer from 1 to 4 inclusive, $m$ stands for a numeral from 0 to 3 inclusive, the sum of $m+n$ being equal to 4, $x$ stands for a member selected from the group consisting of hydrogen, chlorine, bromine, a methyl, hydroxyl, nitro and sulphonic acid group, $y$ stands for a member selected from the group consisting of hydrogen, chlorine, bromine, an alkyl, alkoxy, nitro, sulphonic acid and carboxylic acid group and $z$ stands for a member selected from the group consisting of hydrogen, chlorine, bromine, an alkyl and alkoxy group, and the —SO₂.NH group occupies one of the meta- and para-positions relatively to the azo linkage.

9. The water-soluble mordant azo-phthalocyanine dyestuff of the formula

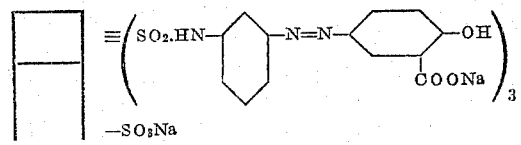

in which A stands for the copper phthalocyanine-3:3′:3″:3‴-tetrasulphonic acid molecule.

10. The water-soluble mordant azo-phthalocyanine dyestuff of the formula

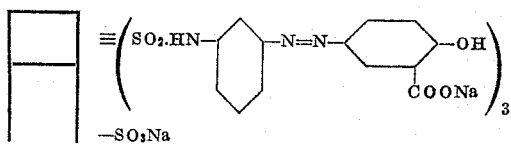

in which A stands for the copper phthalocyanine-4:4′:4″:4‴-tetrasulphonic acid molecule.

11. The water-soluble mordant azo-phthalocyanine dyestuff of the formula

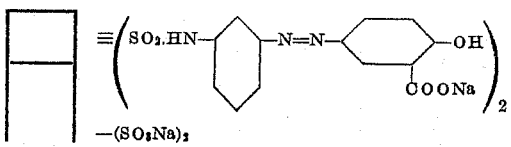

in which A stands for the copper phthalocyanine-4:4′:4″:4‴-tetrasulphonic acid molecule.

12. The water-soluble mordant azo-phthalocyanine dyestuff of the formula

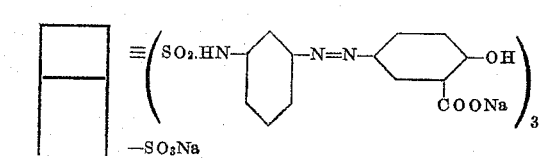

in which A stands for the nickel phthalocyanine-3:3′:3″:3‴-tetrasulphonic acid molecule.

References Cited in the file of this patent
UNITED STATES PATENTS

| | | |
|---|---|---|
| 2,187,716 | Hartmann | Jan. 23, 1940 |
| 2,414,374 | Haddock | Jan. 14, 1947 |